US012737980B2

(12) United States Patent
Naujoks et al.

(10) Patent No.: US 12,737,980 B2
(45) Date of Patent: Sep. 15, 2026

(54) MODELING CONFIGURABLE ATMOSPHERIC CONDITIONS USING POINT CLOUDS FOR SENSOR SIMULATION

(71) Applicant: NVIDIA Corporation, Santa Clara, CA (US)

(72) Inventors: Benjamin Naujoks, Neubiberg (DE); Or Litany, Sunnyvale, CA (US); Steve Butrimas, Orlando, FL (US)

(73) Assignee: NVIDIA Corporation, Santa Clara, CA (US)

( * ) Notice: Subject to any disclaimer, the term of this patent is extended or adjusted under 35 U.S.C. 154(b) by 146 days.

(21) Appl. No.: 18/660,487

(22) Filed: May 10, 2024

(65) Prior Publication Data

US 2025/0349074 A1 Nov. 13, 2025

(51) Int. Cl.
*G06T 17/05* (2011.01)
*G06T 19/20* (2011.01)

(52) U.S. Cl.
CPC .............. *G06T 17/05* (2013.01); *G06T 19/20* (2013.01); *G06T 2210/64* (2013.01); *G06T 2219/2012* (2013.01)

(58) Field of Classification Search
CPC ..... G06T 17/05; G06T 19/20; G06T 2210/64; G06T 2219/2012
See application file for complete search history.

(56) References Cited

U.S. PATENT DOCUMENTS

| | | | |
|---|---|---|---|
| 11,436,484 B2 | 9/2022 | Farabet et al. | |
| 11,801,861 B2 | 10/2023 | Choe et al. | |
| 11,966,673 B2 | 4/2024 | Kristensen et al. | |
| 2020/0401823 A1 | 12/2020 | Miller et al. | |
| 2021/0063578 A1 | 3/2021 | Wekel et al. | |
| 2024/0134022 A1* | 4/2024 | Zeng | G01S 17/931 |

OTHER PUBLICATIONS

Yang et al—"Realistic Rainy Weather Simulation for LiDARs in CARLA Simulator", 2023. Available at: [https://arxiv.org/pdf/2312.12772] (Year: 2023).*
Teufel et al—"Simulating Realistic Rain, Snow, and Fog Variations For Comprehensive Performance Characterization of LiDAR Perception", 2022. For publication date: [https://openreview.net/forum?id=qR (Year: 2022).*

(Continued)

*Primary Examiner* — Daniel F Hajnik
*Assistant Examiner* — Adeel Bashir
(74) *Attorney, Agent, or Firm* — Foley & Lardner LLP

(57) ABSTRACT

In various examples, systems and methods are disclosed relating to transforming sensor measurements according to configurable atmospheric conditions. One or more circuits can identify a point cloud comprising a plurality of points and a parameter of a weather condition to simulate and modify an intensity of at least one of the plurality of points according to the parameter of the weather condition. The one or more circuits can update, based at least on a subset of the plurality of points and the parameter of the weather condition, the point cloud to include one or more additional points.

18 Claims, 9 Drawing Sheets
(4 of 9 Drawing Sheet(s) Filed in Color)

(56) References Cited

OTHER PUBLICATIONS

Rivero et al—"Data Augmentation of Automotive LIDAR Point Clouds under Adverse Weather Situations", 2021. Available at: [https://pmc.ncbi.nlm.nih.gov/articles/PMC8271385/pdf/sensors-21-04503.pdf] (Year: 2021).*

Zhang et al—"L-DIG: A GAN-Based Method for LiDAR Point Cloud Processing under Snow Driving Conditions", 2023. Available at: [https://pmc.ncbi.nlm.nih.gov/articles/PMC10650494/pdf/sensors-23-08660.pdf] (Year: 2023).*

Lee et al—"GAN-Based LiDAR Translation between Sunny and Adverse Weather for Autonomous Driving and Driving Simulation", 2022. Available at: [https://pmc.ncbi.nlm.nih.gov/articles/PMC9325006/pdf/sensors-22-05287.pdf] (Year: 2022).*

* cited by examiner

200A

MODELING CONFIGURABLE ATMOSPHERIC CONDITIONS USING POINT CLOUDS FOR SENSOR SIMULATION

BACKGROUND

Sensor measurements produced by sensors—in particular emissive sensors such as light detection and ranging (LiDAR) sensors—are affected by atmospheric conditions, such as rain, snow, and fog. However, it is challenging to accurately model these weather effects in sensor data due to the dynamic nature and characteristics of different weather patterns.

SUMMARY

Embodiments of the present disclosure relate to systems and methods for simulating realistic atmospheric conditions for sensor measurements. Embodiments of the present disclosure may use or include—for example and without limitation—data generated using or simulating emissive, non-visual sensors, such as light detection and ranging (LiDAR) measurements. The present disclosure provides improvements over conventional approaches for atmospheric modeling. Conventional, model-based techniques for simulating atmospheric conditions lack the ability to realistically simulate different weather conditions and fail to accommodate for interference between multiple real-world sensors. Further, conventional learning-based techniques are targeted solely for camera-based images and cannot be applied to point clouds or other types of sensor measurements produced using (e.g., emissive or non-visual) sensors.

The systems and methods described herein improve upon conventional techniques by simulating realistic atmospheric conditions for sensor measurements using machine-learning models. The techniques described herein can be used to realistically model configurable weather characteristics in point clouds, including point clouds generated using LiDAR sensors. For example, parameters to transform point clouds corresponding to clear weather can be specified to configure the intensity of rain or snow as well as the density of fog, among other properties of the simulated atmospheric conditions. The machine learning models can be used to process the point clouds to generate data to automatically add false positive measurements, and in some implementations remove measurements that fall below a sensor-specific intensity threshold. Additional transformations can be applied to transform the point clouds to conform to specified atmospheric conditions.

At least one aspect relates to a processor. The processor can include one or more circuits. The one or more circuits can identify a point cloud comprising a plurality of points and one or more parameters of a weather condition to simulate. The one or more circuits can modify an intensity of at least one of the plurality of points according to the parameter(s) of the weather condition. The one or more circuits can update, based at least on a subset of the plurality of points and the parameter(s) of the weather condition, a number of points comprised in the point cloud.

In some implementations, the point cloud is formed according to data captured from at least one of: one or more LiDAR sensors or one or more radio detection and ranging (RADAR). In some implementations, the number of points comprised in the point cloud is updated to include one or more additional points. In some implementations, the one or more circuits can determine that each of the one or more additional points are to be included in the point cloud using a first machine learning model updated to predict, for a corresponding emitter of each point of the point cloud, whether a corresponding additional point is to be added.

In some implementations, the one or more circuits can determine, using a second machine-learning model, a respective predicted intensity and a respective predicted distance for each of the one or more additional points. In some implementations, the weather condition comprises at least one of snow, rain, or fog, and the parameter(s) include at least one of snow rate, rain rate, or fog intensity, respectively. In some implementations, the one or more circuits can filter at least one point from the updated point cloud.

In some implementations, the one or more circuits can replace a point of the plurality of points with an additional point of the one or more additional points. In some implementations, the one or more circuits can replace the point responsive to the point satisfying an emitter threshold and responsive to a respective intensity of the point being less than a respective intensity of the additional point. In some implementations, the one or more circuits can modify a respective distance of a subset of the plurality of points of the updated point cloud.

Another aspect relates to a processor. The processor can include one or more circuits. The one or more circuits can identify a training dataset comprising a plurality of points, each of the plurality of points associated with a corresponding label identifying a prediction for an additional point and one or more corresponding weather condition parameters. The one or more circuits can provide the training dataset to update a neural network, the neural network to predictions of whether additional points are to be added for corresponding emitters of input point clouds.

In some implementations, the one or more circuits can update/train a second neural network to generate predicted intensities for the additional points. In some implementations, the one or more circuits can update/train the second neural network to generate predicted distances for the additional points. In some implementations, the training dataset comprises a plurality of point clouds, at least one point cloud of the training dataset being associated with at least one respective weather condition parameter and at least one respective set of labels. In some implementations, the weather condition parameter(s) include at least one of: snow rate, rain rate, or fog intensity, respectively. In some implementations, the neural network comprises a convolutional neural network.

Yet another aspect of the present disclosure is related to a method. The method can include identifying, using one or more processors, a point cloud comprising a plurality of points and at least one parameter of an atmospheric condition to simulate. The method can include modifying, using the one or more processors, an intensity of at least one of the plurality of points according to the at least one parameter of the atmospheric condition. The method can include updating, using the one or more processors and based at least on a subset of the plurality of points and the at least one parameter of the atmospheric condition, a number of points comprised in the point cloud.

In some implementations, updating the number of points comprises including one or more additional points. In some implementations, the method can include determining, using the one or more processors, that at least one of the one or more additional points are to be included in the point cloud using a first machine learning model that predicts, for a corresponding emitter of the at least one point of the point cloud, whether a corresponding additional point is to be added.

In some implementations, the method can include determining, using the one or more processors and a second machine-learning model, a respective predicted intensity and a respective predicted distance for each of the one or more additional points. In some implementations, the method can include filtering, using the one or more processors, at least one point from the updated point cloud.

The processors, systems, and/or methods described herein can be implemented by or included in at least one of a system associated with an autonomous or semi-autonomous machine (e.g., an in-vehicle infotainment system); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for performing generative AI operations, a system implemented using at least one language model—such as one or more large language models (LLMs) and/or one or more vision language models (VLMs), a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present systems and methods for generative techniques for transforming sensor measurements according to configurable atmospheric conditions are described in detail below with reference to the attached drawing figures, wherein.

DETAILED DESCRIPTION

Figure 1:
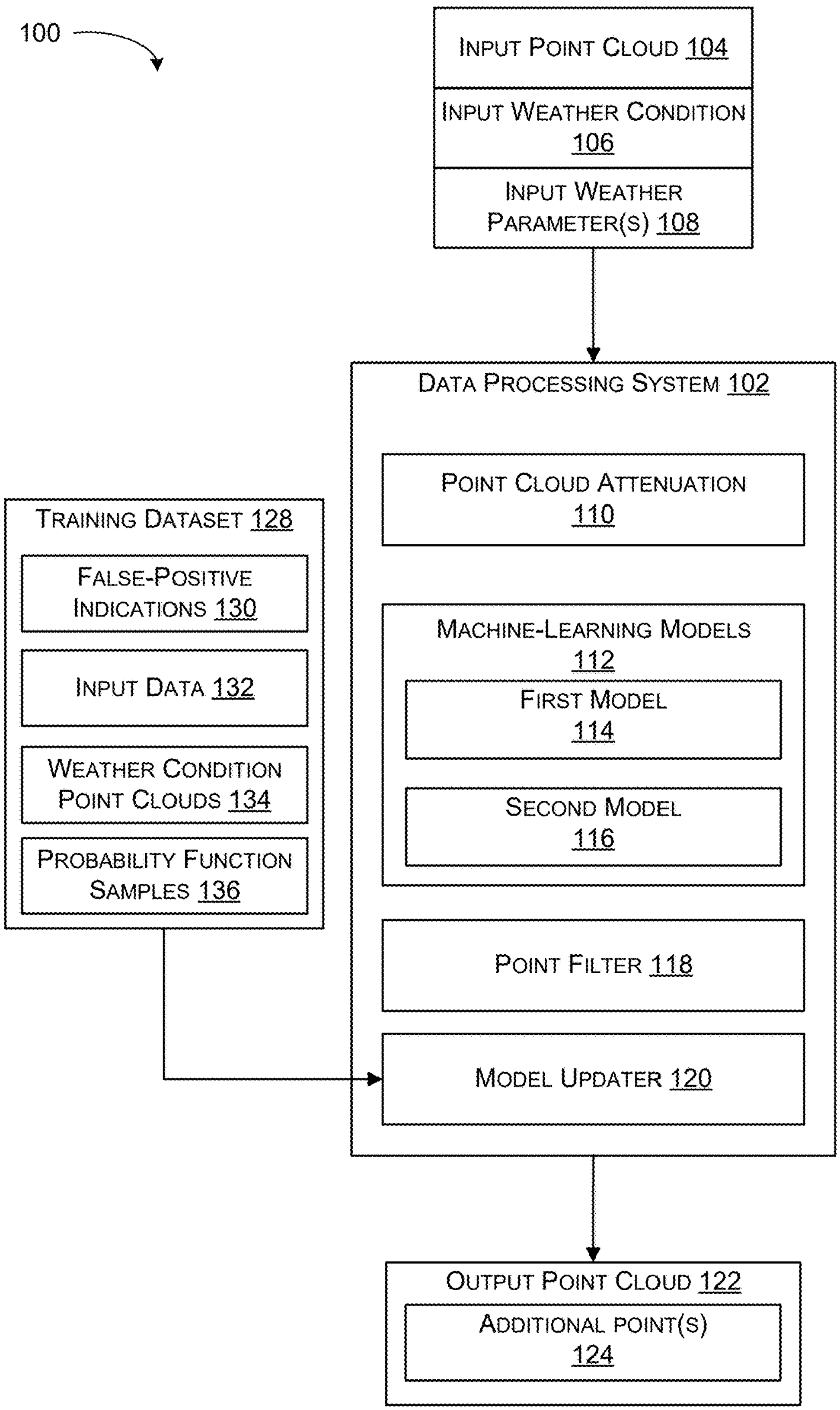
FIG. 1 is a block diagram of an example system that implements generative techniques for transforming sensor measurements according to configurable atmospheric conditions, in accordance with some embodiments of the present disclosure.

This disclosure relates to systems and methods for simulating realistic atmospheric conditions for sensor measurements, particularly emissive and non-visual sensors such as but not limited to light detection and ranging (LiDAR) measurements. Traditional approaches to simulating atmospheric conditions lack the ability to realistically simulate different weather conditions and fail to accommodate for interference between multiple real-world sensors. For example, purely model-based approaches do not account for interferences between neighboring sensors (e.g., neighboring emitters in LiDAR). Such conventional approaches are modeled using a unimodal distribution, resulting in unrealistic changes to sensor characteristics when modelling different weather patterns. Learning-based techniques are targeted solely for camera-based images, and therefore cannot account for or be applied to sensor measurements such as LiDAR point clouds.

The systems and methods described herein provide techniques for simulating realistic atmospheric conditions for sensor measurements using machine-learning models to realistically model configurable weather characteristics in point clouds. These techniques can be applied to point clouds captured in clear atmospheric conditions to simulate atmospheric conditions including rain, snow, and fog, among others. Parameters can be specified to configure the intensity of rain or snow as well as the density of fog, among other properties of the simulated atmospheric conditions. The machine learning models used to process the point clouds generate data used to automatically add false positive measurements, and in some implementations remove measurements that fall below an intensity threshold.

To simulate configurable weather conditions, weather-specific rule-based models are first used to attenuate selected points of a sensor measurement point cloud. Points may be selected and attenuated according to the parameters specified for the weather that is to be simulated. The degree of attenuation may also be a function of the distance of the points as represented in the point cloud. Machine-learning models are then used to simulate false positive points in the point cloud.

In some implementations, one or more machine-learning models can be trained/updated to attenuate point clouds generated by sensors. For example, a machine-learning model can be trained/updated to receive position and/or intensity values of one or more input points of a point cloud, as well as an input weather parameter. The machine-learning model can generate attenuated intensity values for one or more of the input points to simulate attenuation that naturally occurs during corresponding input weather conditions. In some implementations, combinations of rule-based techniques and machine-learning models may be utilized to perform initial attenuation of an input point cloud. Attenuated data may be provided as input to a first machine-learning model used to generate false-positive points for simulating weather and atmospheric conditions.

In some implementations, the first machine-learning model (e.g., a deep neural network (DNN), etc.) is trained and/or updated to predict, for each potential point according to the firing pattern of the sensor, a probability value that is used to sample if a false positive point should be added for a corresponding emitter of each point. The first machine-learning model can be executed to predict false positives for the point cloud given the position of the point and parameters of the weather to be simulated. A second machine-learning model is then used to predict a distance and intensity for each false positive point generated using the first machine-learning model.

The false positive points can be added as another echo for the emitter or may replace the "clean" point in the point cloud for which the false positive was generated. For example, a false positive point may replace a point in the point cloud if the point cloud included a threshold number of echoes for that point, and the predicted intensity of the false positive point is greater than the attenuated intensity of the point being replaced. Once false positive points are added, the distance of any remaining points that are not false positives can be dilated according to a function of the parameters of the weather being simulated. Dilating the distance of the points in the point cloud may include increasing and/or decreasing the distance of one or more points of the point cloud 104 relative to the position of the emitter(s) of the sensor. Any points having an attenuated intensity smaller than a minimum intensity threshold (e.g., smaller than the sensor's sensitivity) can be removed from the point cloud. In some implementations, points to be removed may be identified using a third machine-learning model.

FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 can include any function, model (e.g., machine-learning model), operation, routine, logic, or instructions to perform various functionality described herein.

The system 100 is shown as including the data processing system 102, the input point cloud 104, the input weather condition 106, the input weather parameter(s) 108, and the training dataset 128. The data processing system 102, or the components thereof, can access the training dataset 128 to retrieve input point clouds (e.g., input data 132) and corresponding labels (e.g., false positive indications 130), which may be update/train machine-learning models 112 maintained by the data processing system 102. The training dataset 128 may be maintained via an external server, distributed storage/computing environment (e.g., a cloud storage system), or may be stored via memory of the data processing system 102.

The data processing system 102 can execute a point cloud attenuation 110 process, machine learning models 112 (including at least a first model 114 and a second model 116), and a point filtering process 118 to simulate weather conditions in input point clouds 104, according to the techniques described herein. The input point clouds 104 may be any type of point cloud captured using any type of (e.g., emissive or non-visual) sensor, such as a LiDAR sensor, a RADAR sensor, an ultrasonic sensor, among others. The input point cloud 104 may be received or retrieved from one or external computing systems, provided in a request to process the input point cloud 104, or maintained in storage of the data processing system 102 for processing. The input point cloud 104 may include any number of points in a three-dimensional (3D) space.

The input point cloud 104 can include any number of points captured via one or more sensors. The points in the input point cloud 104 can be stored in one or more data structures that define the position of the points relative to a predetermined frame of reference. The points in the input point cloud 104 may include raw or processed measurements from a sensor. In an example where an input point cloud 104 represents LiDAR data, each point in the point cloud may correspond to a respective emitter of the LiDAR sensor, and can be stored with an indication, or otherwise encoded with, an indication of the emitter corresponding to the respective point. In some implementations, multiple points may correspond to the same emitter, but captured at different distances from the emitter. For example, in some implementations, emitters of a LiDAR sensor can capture multiple echoes from the same emission, each of which may be represented as corresponding point in the input point cloud 104.

The points in the input point cloud 104 may collectively form a 3D representation of an environment. Each point in the input point cloud 104 may be associated with an intensity value, for example, representing an intensity of an echo detected by the sensor, and may be associated with a 3D position value. In some implementations, the 3D position value may be or may include a distance value from a predetermined point in 3D space representing the position of the sensor (e.g., the location from which a signal was emitted). In one example, the input point cloud 104 can be generated using one or more LiDAR sensors (and/or other types of sensors, cameras and/or scanners) positioned on a vehicle that navigates through an environment. The input point cloud 104 may include metadata for the sensor(s) used to generate the input point cloud 104. For example, in some implementations, the metadata may indicate a maximum number of echoes for an emitter of the corresponding sensor or a minimum threshold strength for the sensor to detect one or more points, among others.

Data indicating how the input point cloud 104 is to be modified can be provided and/or stored with the input point cloud 104. For example, the data processing system 102 can receive or store an input weather condition 106 and one or more input weather parameters 108 that indicate how the input point cloud 104 is to be modified. The input weather condition 106 may be any type of weather condition that can affect how points would be captured by sensors. The input weather condition 106 may indicate one or more of fog, mist, rain, snow, high humidity, dust/sandstorms, high or low air pressure, lightning, or extreme temperatures, among others. The input weather condition 106 may be provided as an identifier, flag, or another type of indication in association with the input point cloud 104. The input weather condition 106 may be provided in a request to transform the input point cloud 104 and may be provided with or otherwise be associated with one or more input weather parameters 108.

The one or more input weather parameters 108 may be parameters that indicate various properties of a corresponding input weather condition 106. For example, if the input weather condition 106 is fog, one input weather parameter 108 may include fog density. In another example, if the weather condition 106 is rain, snow, or sleet, the input weather parameters 108 may include rain rate, snow rate, or sleet rate, as well as density of rain, sleet, or snow. The input weather parameters 108 can include any type of parameter relating to the input weather condition 106, including but not limited to humidity level, temperature level, air pressure, particulate density distribution, or any other indication of an atmospheric condition. Each of the input weather conditions 106 and/or the input weather parameters 108 may be represented numerically, or may otherwise be encoded by the data processing system 102 to convert the input weather conditions 106 and/or the input weather parameters 108 into a format compatible with the machine-learning models 112.

The data processing system 102 can identify one or more of the input point cloud 104, the input weather condition 106, and one or more input weather parameters 108 to simulate the input weather condition in the input point cloud 104. The data processing system 102 can identify said data, for example, in a request to simulate the weather condition 106 in the input point cloud 104. The request may be provided via one or more computing systems in communication with the data processing system 102, or may be specified via input to the data processing system 102. In some implementations, the data processing system 102 can receive an identifier of an input point cloud 104, an input weather condition 106, and/or one or more input weather parameters 108, and can retrieve the identified data from one or more external or internal storage systems using the identifier(s).

Upon identifying the input point cloud 104, the input weather condition 106, and/or the input weather parameter(s) 108, the data processing system 102 can execute processes to simulate the input weather condition 106 in the input cloud 104 to generate an output point cloud 122. To simulate the input weather condition 106 in the input point cloud 104, the data processing system 102 can execute a point cloud attenuation 110 process to modify an intensity one or more points in the input point cloud 104 according to the input weather parameter 108 of the input weather condition 106.

The point cloud attenuation 110 process can be or can include a rule-based process in which the intensity of one or more points in the input point cloud 104 as a function of the weather parameter 108. In example where fog or particulates (e.g., dust, smoke, smog, etc.) are to be simulated in the input point cloud, the point cloud attenuation 110 process can be executed to attenuate an intensity of one or more of the points according to the density of the fog or particulates as indicated in the input weather parameter 108. In an example where rainfall, snowfall, or sleet are to be simulated, the point cloud attenuation 110 process can be executed to attenuate an intensity of one or more points of the input point cloud 104 according to the precipitation rate and/or precipitation density.

In executing the point cloud attenuation 110 process, the data processing system 102 can solve one or more equations that physically model light or electromagnetic wave propagation in physical media relating including the input weather condition 106. Any suitable physical modeling equation or function for rain, snow, sleet, fog, particulate matter, or another type of input weather condition 106 can be solved or executed for each point of the point cloud 104 to determine an amount by which the intensity of said point is to be attenuated. In some implementations, the amount by which the intensity of a point is to be attenuated may be a function of the distance of the point from a location of the emitter(s) of the sensor, as indicated in the input point cloud 104. In some implementations, the amount by which the intensity of a point is to be attenuated may be a function of a relative location of the point within the input point cloud 104. In some implementations, the data processing system 102 can calculate the distance based on a location of the point and a predetermined location of the emitter in the frame of reference of the input point cloud 104.

In some implementations, the point cloud attenuation 110 process can include execution of one or more machine-learning models, which may be trained/updated according to the techniques described herein. The machine-learning model may be, in a non-limiting example, a neural network (e.g., a DNN, a convolutional neural network (CNN), etc.). The machine-learning model can be trained/updated to receive the input point cloud 104 and generate a corresponding attenuated point cloud. In one example, the training dataset 128 may include training/update data used to train the machine-learning model for the point cloud attenuation 110 process. For example, the training dataset 128 can include ground-truth attenuated data for one or more input point clouds (e.g., input data 132), as well as corresponding input weather conditions and/or parameters as described herein.

As part of the point cloud attenuation 110 process, the machine-learning model can generate attenuated intensity values for one or more of the points of the input point cloud 104 to simulate attenuation captured by sensors during the input weather condition 106 according to the input weather parameter(s) 108. In some implementations, combinations of rule-based techniques and machine-learning models may be utilized to perform initial attenuation of the input point cloud 104. Attenuated point cloud data may be provided as input to the first machine-learning model 114, to generate false-positive points for simulating the input weather condition 106 according to the input weather parameter(s) 108. Examples showing how attenuation performed using the point cloud attenuation 110 process are shown in FIGS. 2A and 2B.

Figure 2A:
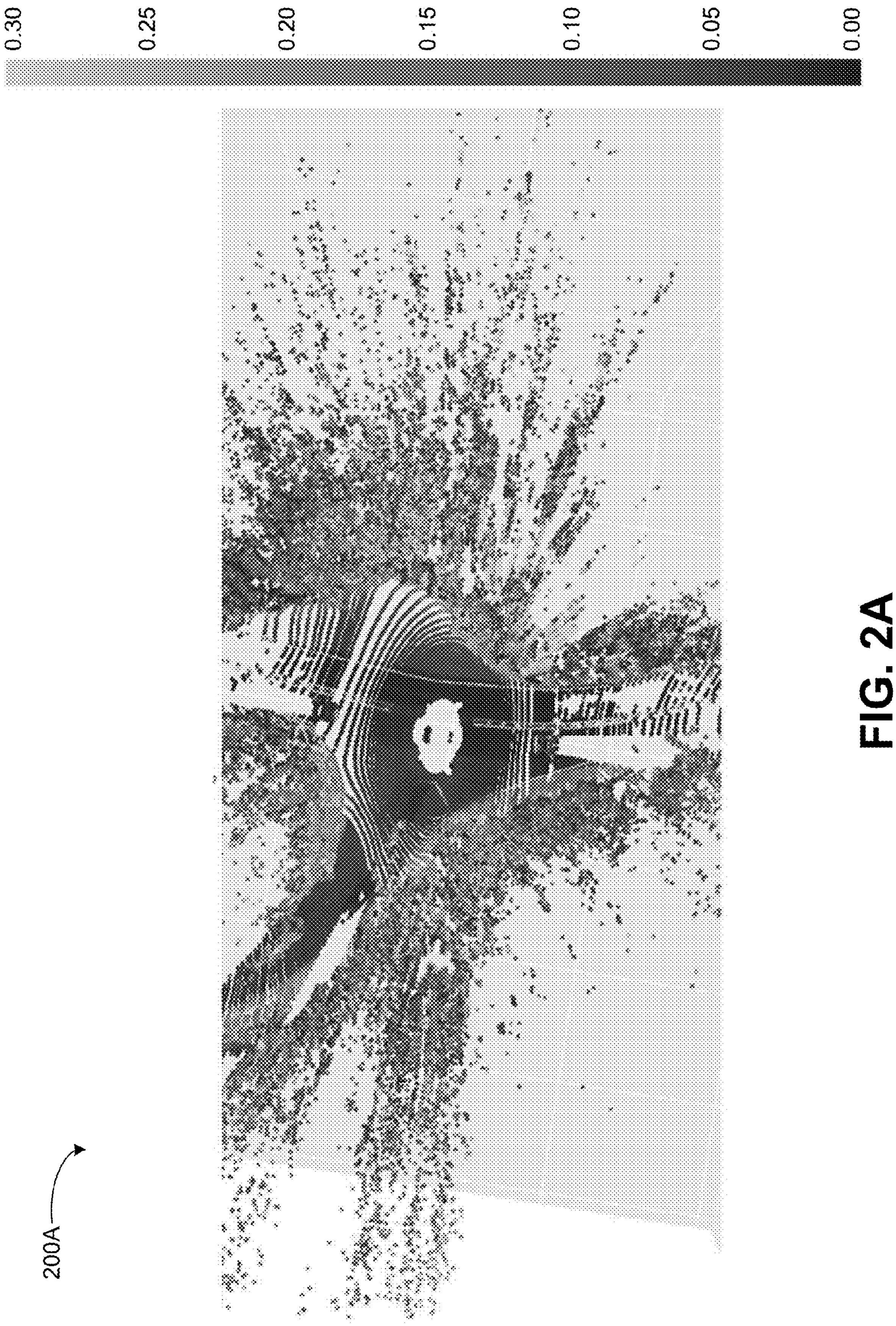
FIGS. 2A, 2B, 2C, illustrate example plots showing a clean point cloud, an attenuated version of the clean point cloud, and the clean point cloud transformed according to the techniques described herein, in accordance with some embodiments of the present disclosure.
Figure 2B:
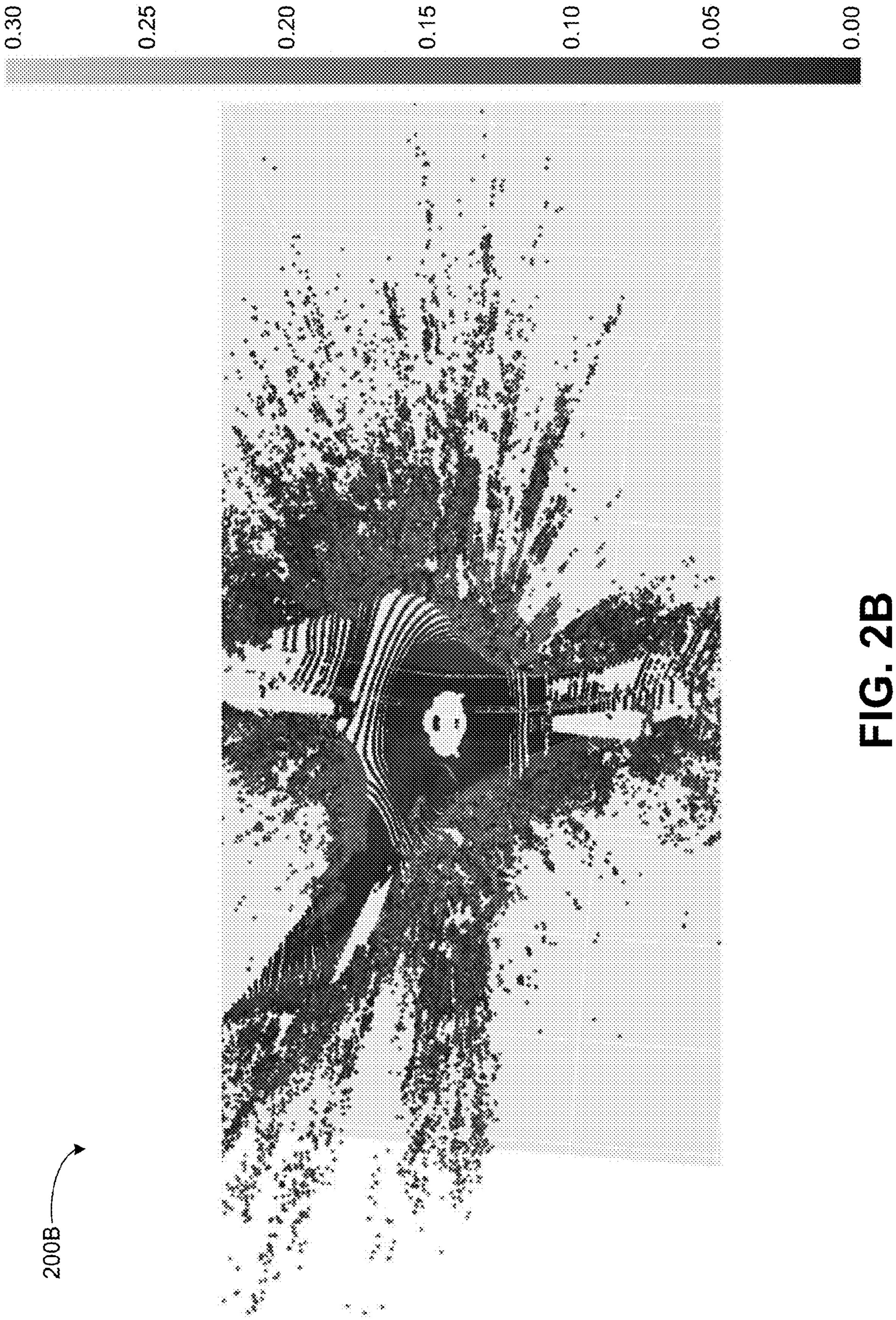

Referring to FIGS. 2A and 2B, illustrated are example plots 200A and 200B of 3D point clouds before and after execution of attenuation according to a specified weather condition. FIG. 2A shows a point cloud (e.g., an input point cloud 104) that was captured during daylight under clear weather conditions, and therefore does not include any natural attenuation from rain, fog, snow, or other atmospheric conditions. In the plot 200A of FIG. 2A, the color of each point corresponds to its respective intensity, with a yellow color representing a high-intensity point and a dark blue color representing a low-intensity point. Relative to the plot 200A of FIG. 2A, the plot 200B of FIG. 2B shows points having the same positions but with attenuated intensity.

For example, instead of including several points with a yellow intensity, the intensity of the points shown in the plot 200B of FIG. 2B have been attenuated according to the point cloud attenuation 110 process. In this example, points in the plot 200B of FIG. 2B are attenuated as part of simulating fog in the point cloud shown in the plot 200A. As described herein, the amount by which the points in the point cloud are attenuated can be a function of a specified fog density and a distance of each point in the point cloud from a location of one or more emitter(s) of the sensor. In the example shown in FIGS. 2A and 2B, the location of the emitter(s) that produced the point cloud is the center of each plot around which rings of points are indicated. Although attenuation for fog is shown in this example, it should be understood that similar attenuation techniques may be executed to produce an attenuated point cloud for any weather condition described herein, using a suitable physical equation or model for the weather condition.

Referring back to FIG. 1, once the input point cloud 104 has been attenuated according to the input weather condition 106 and one or more input weather parameters 108, the data processing system 102 can execute the machine-learning models 112 to update the point cloud to include one or more additional points 124. In addition to attenuating the intensity of reflected signals from emitters of (e.g., emissive or non-visual) sensors, weather or atmospheric conditions may cause one or more "false positive" points to be captured by the sensor. The false positive points may be created by reflections due to precipitation or particulate matter in the atmosphere during the sensor scan.

In an example where the sensors are LiDAR sensors, atmospheric conditions such as rain, snow, or other precipitation can scatter the laser beams used by the LiDAR sensors to scan the environment. This scattering can create additional points in the LiDAR data, leading to false positive readings. For example, raindrops or snowflakes or snowflakes may be interpreted as real sensor readings, resulting in inaccuracies in the point cloud data. Likewise, water droplets that make up fog or mist can scatter LiDAR beams and cause them to deviate from their intended path, also resulting in false positive points. Additionally, weather conditions can sometimes create reflective surfaces, such as wet roads or snow-covered surfaces, which may create multiple reflections from a single LiDAR beam and result in false positive points in the data. Weather conditions such as high humidity in the environment may cause refraction of sensor signals, also resulting in possible false positive points in captured point clouds.

To generate and determine the properties of such additional points using the input weather condition 106 and the input weather parameter(s) 108, the data processing system 102 can execute the machine-learning models 112. The machine-learning models 112 may be stored, maintained, or in some implementations retrieved/received by the data processing system 102 to simulate specified input weather conditions in the input point cloud 104. The data processing system 102 can execute the model updater 120 to train/update the machine-learning models 112, as described in further detail herein. In some implementations, the machine-learning models 112 may be trained/updated for particular input weather conditions 106. For example, a first set of machine-learning models 112 may be trained/updated to generate and determine attributes for additional points 124 to simulate rain in the input point cloud 104, while a second set of machine-learning models 112 may be trained/updated to generate and determine attributes for additional points 124 to simulate fog.

The machine-learning models 112 are shown as including a first model 114 and a second model 116. The data processing system 102 can execute the first model 114 to determine each emitter of the sensor that was used to generate the points of the input point cloud 104, whether a corresponding additional point 124 is to be added. For example, as described herein, emitters used by sensors may detect multiple points from a single signal emission (e.g., a single LiDAR laser signal transmitted by a single emitter). These multiple points may be captured when the signal reflects back from multiple objects, particles, or locations in the environment. Each point in the input point cloud 104 may be stored in association with an identifier and scan coordinates (e.g., sensor emitter direction, angle, or location, etc.) of the emitter used to generate the point. As a single signal from an emitter may result in multiple points, multiple points may be stored in association with the same identifier and scan coordinates, indicating that the emitter detected multiple points from a single signal.

During a sensor scan (e.g., an emissive sensor scan), the emitter(s) of the sensor may iteratively change direction (e.g., using rotation and/or one or more rotating mirrors) to emit signals that cover a wide field of view. An input point cloud 104 may include a scan performed iteratively to scan the environment in different directions and/or angles (sometimes referred to as a "scan direction"), with each emitter generating a respective scan signal (e.g., a laser beam, a RADAR signal, etc.) at each scan direction/angle. Each of these signals may correspond to respective point(s) detected for that scan direction and emitter, which are indicated in the input point cloud 104. While scanning an environment during a weather condition such as fog or rain, false-positive points (e.g., reflections from precipitation, moisture, or particle that are detected as corresponding to a solid surface) may be detected for certain scan directions and emitters.

As described herein, the points in the input point cloud 104 may correspond to a single scan of the environment, for example, where each emitter in the corresponding sensor has generated an emission signal toward each possible scan direction a single time. To simulate false-positive points in an input point cloud 104 captured during clear weather conditions, the data processing system 102 can execute the first model 114 to generate indications of whether an additional point 124 is to be added to as detected for a respective emitter and scan direction in the input point cloud 104. The indications of whether an additional point 124 is to be added for a respective emitter and scan direction may be binary values (e.g., zero, one). The first model 114 may therefore generate an output data structure that includes whether each scan direction and emitter is to have detected a false positive point, thereby indicating that an additional point 124 is to be added as captured by said emitter.

The first model 114 may be any type of machine-learning model capable of generating numerical output values that indicate whether any additional point(s) 124 are to be added to the input point cloud 104. For example, the first model 114 may include any type of neural network, such as a deep neural network (DNN). In some implementations, the first model 114 may include one or more convolutional layers, and may be or include a CNN. The first model 114 may be trained/updated to generate an output data structure that indicates whether corresponding emitters and scan directions are to have detected a false-positive point (e.g., an indication that an additional point 124 is to be added). In one example, the output data structure may be a matrix or two-dimensional tensor. Furthering this example, each row in the output data structure can correspond to a respective emitter of the sensor and each column in the output data structure can correspond to a respective scan direction for the emitters of the sensor. As such, in this example, each position in the 2D output data structure corresponds to a respective emitter and scan direction of the sensor. A representation of this example output data structure is shown in Table 1 below.

TABLE 1

| | 0 | 36 | 72 | 108 | 144 | 180 | 216 | 252 | 288 | 324 |
|---|---|---|---|---|---|---|---|---|---|---|
| Emitter 1 | 0 | 0 | 0 | 0 | 0 | 1 | 0 | 0 | 0 | 0 |
| Emitter 2 | 0 | 0 | 0 | 1 | 0 | 0 | 0 | 0 | 0 | 0 |
| Emitter 3 | 1 | 0 | 0 | 0 | 0 | 0 | 0 | 1 | 0 | 0 |
| Emitter 4 | 0 | 0 | 1 | 0 | 0 | 1 | 0 | 0 | 0 | 0 |
| Emitter 5 | 0 | 0 | 0 | 0 | 1 | 0 | 0 | 0 | 1 | 0 |

In Table 1, bolded labels for each row and column are not included in the data structure, and are provided for example purposes. In the above example output data structure, five emitters of the sensor are represented at scan locations ranging from 0 to 324 degrees, inclusive, in increments of 36 degrees. However, it should be understood that the first model 114 may be trained/updated to generate data structures having any suitable dimensions, and to represent indications of false-positive points for any number of emitters and/or scan directions. For example, the output data structure may be generated for an emissive sensor having ten emitters, where a complete scan includes one revolution (e.g., 360 degrees) at any suitable interval (e.g., 0.1 degrees per adjustment, etc.). In some implementations, and as described in further detail herein, the first model 114 may be trained/updated to generate a subset of the output data structure (sometimes referred to herein as a "patch" of the output data structure), where each patch represents corresponding indications of whether additional points 124 are to be added for a subset of the total number of emitters and/or scan directions implemented by the sensor.

The first model 114 can be trained/updated to generate the output data structure given a set of input data. The set of input data can include a random number generated by the data processing system (e.g., a Gaussian random variable) and the input weather condition 106 and/or the input weather parameter(s) 108. For example, in an implementation where a corresponding set of machine-learning models 112 are trained/updated for a respective input weather condition 106, the set of input data can include a random number and the one or more input weather parameters 108 for the corresponding input weather condition 106. In an implementation where the machine-learning models 112 are trained/updated for several different weather conditions, the set of input data can include a random number, an identifier of the input weather condition 106, and the one or more input weather parameters 108. In implementations where the first model 114 is trained/updated to generate a patch of an output data structure representing all emitters and scan directions for an input point cloud 104, the set of input data may include an identifier of the patch, which may include or otherwise encode a location and/or range of output values of the output data structure to which the patch corresponds.

The first model 114 can be trained/updated using a suitable training/updating process. To train/update the first model 114 of the machine-learning models 112, the model updater 120 can identify a training dataset 128. As shown, the training dataset 128 includes one or more sets of indications 130. Each set of false-positive indications 130 may be or otherwise include an output data structure having the same dimensions of an output layer described herein. The output data structure can be similar in structure to the output data structure described in connection with Table 1. For example, each position in the output data structure can include a corresponding label for whether an additional point is to be added for a corresponding emitter and scan direction.

Each set of false-positive indications 130 can be used as ground truth data for training/updating the first model 114 using a corresponding set of input data 132. The training dataset 128 can include a corresponding set of input data 132 for each set of false-positive indications 130. The input data 132 may include one or more of a weather condition, weather condition parameter(s), and random values that correspond to a respective set of false-positive indications 130. The set of false-positive indications 130 and corresponding input data 132 may be generated from one or more weather condition point clouds 134. The weather condition point clouds 134 can include point clouds captured in the real world under a particular weather condition, such as rain, snow, fog, or other weather conditions described herein.

As described herein, certain weather conditions can affect how sensors (e.g., emissive sensors) capture point clouds. As such, the weather condition point clouds 134, which can be used to generated training/updating samples for the machine-learning models 112, can include a number of false-positive points, which may be identified as a false positive using a flag or associated data structure. Each weather condition point cloud 134 may be used to generate a corresponding set of false-positive indications 130, which can be used as ground-truth data for supervised learning processes to train/update the first model 114, in some implementation. For example, the data structure storing a set of false positive indications 130 (e.g., similar to that of Table 1) can be updated by identifying the corresponding emitter and scan direction for each point in the weather condition point cloud 134, and populating a corresponding data structure storing the set of false positive indications 130 accordingly (e.g., with binary values, probability values, etc.).

In some implementations, the false-positive indications 130 may correspond to a subset of an output data structure (e.g., a patch, as described herein). In such implementations, the false-positive indications 130 may correspond to a respective set of input data 132 that includes an identifier of the patch to which the false-positive indications 130 correspond, which may include or otherwise encode a location and/or range of output values of the output data structure to which the patch corresponds.

The model updater 120 can implement a supervised training process to train/update the first model 114. To do so, the model updater 120 can access the training dataset 128, which may be specified in a request to train/update the first model 114 received by the data processing system 102. In some implementations, the training dataset 128 may be maintained or otherwise stored in a separate server, such as a cloud storage system, that is accessible to the data processing system 102 (and the components thereof) via a communications network. In some implementations, the training dataset 128 is maintained in memory or storage of the data processing system 102.

Once the training dataset 128 for the first model 114 is accessed, the model updater 120 can provide one or more training/updating examples (e.g., a set of input data 132) as input to the first model 114 and can execute the first model using the training example. For example, if the first model 114 is a neural network, the model updater 120 can execute the first model 114 by performing mathematical computations of each layer (e.g., convolutions, activation functions, multiplications by weight values, etc.) and propagating the resulting data to the next layer in the network. The output produced by the last layer of the first model 114 can resemble (e.g., have the same tensor/matrix shape) as the output data structures described herein, and may be similar to the output data structure shown in Table 1.

The output data structure produced by providing a set of input data 132 as input to the first model 114 is compared to a corresponding set of false-positive indications 130 to calculate/determine an error between the output produced by the first model 114 and the expected output (e.g., the corresponding set of false-positive indications 130). The error may be calculated using a suitable loss function. In some implementations, multiple training/updating examples may be provided as input to the first model 114, and can be compared to multiple corresponding sets of false-positive indications 130, to calculate the error using the loss function. The error calculated using the loss function is then utilized to iteratively train/update the trainable/updateable parameters of the first model 114. The trainable/updatable parameters may be updated using backpropagation and a suitable optimization algorithm to minimize the error produced by the loss function.

In some implementations, a validation set, which may include data similar to that shown as included in the training set 128, may be utilized to evaluate the performance of the first model 114 during a training/updating process. For example, the validation set may include a subset of the training dataset 128 that is set aside from the training dataset 128 and used to test the accuracy of the first model 114. In a non-limiting example, the accuracy of the first model 114 may be tested periodically (e.g., after predetermined numbers of training/updating examples have been used to train/update the first model 114, etc.). This process can be repeated until a training termination condition is reached, such as an accuracy threshold being met or upon using a predetermined number of training/updating examples to train/update the first model 114. The model updater 120 can therefore update/train the first model 114 using the training dataset to generate predictions of whether additional points are to be added for corresponding emitters of input point clouds.

The trained/updated first model 114 can be executed by the data processing system 102 to generate an output data structure, which may be similar to the output data structure described in connection with Table 1, that indicates for which emitters and scan directions additional points are to be added to the input point cloud 104. To do so, the data processing system 102 can generate a random value and provide the random variable and the input weather condition 106 and/or the input weather parameter(s) 108 as input to the first model 114, as described herein. In an implementation where the first model 114 is trained/updated to generate a patch (e.g., a subset) of an output data structure, the data processing system 102 iteratively provides the same input data with each patch identifier of each patch that makes up the output data structure to iteratively generate the patches. Once generated, the data processing system 102 can then combine the patches into a combined output data structure, which can include indications of whether to generate corresponding additional points for each emitter and scan direction for the input point cloud 104.

Once the predictions of whether additional points 124 are to be added for corresponding emitters of the sensor are determined via the output data structure(s) of the first model 114, the data processing system 102 can determine a respective predicted intensity and a respective predicted distance for each of the one or more additional points 124. To do so, the data processing system 102 can execute the second model 116 of the machine-learning models 112. The second model 116 can be any type of machine-learning model capable of generating numerical output values corresponding to the distance and/or intensity of any additional points indicated in the output of the first model 114.

In one example, the second model 116 may include any type of neural network, such as a DNN. However, other machine-learning models are also possible, including but not limited to regression models (e.g., linear regression models, support vector machine (SVM) models, etc.). The second model 116 may be trained/updated to a cumulative distribution function (CDF) that models the distances and/or intensities of false-positive points included in input point clouds. For example, the second model 116 can be trained/updated to receive one or more weather parameters (e.g., in corresponding input data 132, one or more input weather parameters 108) as input and generate an output vector, list, or other data structure that includes samples from the CDF that models the false-positive points detected during a particular weather condition given an input weather parameter (e.g., in corresponding input data 132). The output of the second model 116 can include any number of samples of the CDF, including but not limited to 512 samples, 1024 samples, 2048 samples, or any other number of samples. The number of samples of the CDF can be a hyperparameter of the second model 116 (and the training/updating samples thereof).

To train/update the second model 116, the model updater 120 can access the training dataset 128 to retrieve training/updating data for the second model. Training/updating samples for the second model 116 can include weather conditions and/or weather parameters indicated in input data 132 and a corresponding set of probability function samples 136. The probability function samples can be any suitable number of samples from a CDF derived from false-positive points for the given weather condition (e.g., from corresponding weather condition point clouds 134). In implementations where a corresponding set of machine-learning models 112 are trained/updated for a respective input weather condition 106, the set of input data 132 used to train/update the second model 116 includes the one or more input weather parameters 108 for the corresponding input weather condition 106, which are associated with a corresponding set of probability function samples 136 (e.g., as ground-truth data). In implementations where the machine-learning models 112 are trained/updated for several different weather conditions, the set of input data 132 used to train/update the second model 116 includes an identifier of the input weather condition 106 and the one or more input weather parameters 108, each of which are associated with a corresponding set of probability function samples 136 (e.g., as ground-truth data).

In some implementations, the probability function samples 136 for a given set of input data 132 can be generated by the data processing system 102 based at least on a weather condition point cloud 134 associated with the weather condition in the input data 132. For example, the data processing system 102 can empirically determine the CDF for the distribution of intensities and/or distances of each false-positive point in a weather condition point cloud 134. To do so, the data processing system 102 can identify the intensities and/or distances of each false-positive point in the weather condition point cloud 134, calculate the cumulative probability of each intensity and/or distance across all false-positive points in the weather condition point cloud 134. The cumulative probability for an intensity and/or distance value can be the fraction of values less than or equal to the intensity and/or distance value. This distribution of cumulative probability values can be sampled (e.g., which may include interpolation) at regular intervals to populate a data structure storing a corresponding set of probability function samples 136 for the weather condition point cloud 134.

In some implementations, a first set of probability function samples 136 can be generated for the intensity values of false-positive points in the weather condition point cloud 134, and a second set of probability function samples 136 can be generated for the distance values of false-positive points in the weather condition point cloud 134. Each of the first and second sets of functionality can be stored in association with a corresponding weather condition parameter of the weather condition point cloud 134, which may be used collectively as a training/updating sample for the second model 116, as described herein.

To train the second model 116, the model updater can provide one or more training/updating examples (e.g., the weather parameter(s) of from the input data 132) as input to the second model 116 and can execute the second model using the training example. For example, if the second model 116 is a neural network, the model updater 120 can execute the second model 116 by performing mathematical computations of each layer (e.g., convolutions, activation functions, multiplications by weight values, etc.) and propagating the resulting data to the next layer in the network. The output produced by the last layer of the second model 116 can resemble (e.g., have the same tensor/matrix shape as) the list of samples in the corresponding set of probability samples 136 used as ground-truth data for the input data 132.

The output data structure produced by providing a set of input data 132 as input to the second model 116 is compared to the corresponding set of probability function samples 136 (e.g., the empirical CDF calculated from the false-positive points of the corresponding weather condition point cloud 134) to calculate an error between the output produced by the second model 116 and the expected output (e.g., using a suitable loss function, as described herein). The error calculated using the loss function is then utilized to iteratively train/update the trainable/updateable parameters of the second model 116. The trainable/updatable parameters may be updated using backpropagation and a suitable optimization algorithm to minimize the error produced by the loss function. The second model 116 may be trained/updated until a training/updating termination condition has been met, such as an accuracy threshold being met or upon using a predetermined number of training/updating examples to train/update the second model 116. A validation set may be used to evaluate the accuracy or other performance metrics of the second model 116, as described herein.

Using these techniques, the model updater 120 can train/update the second model 116 to generate an array of output samples of a CDF that models the probabilities of intensity values and/or distance values given one or more input weather parameters 108 and/or an input weather condition 106. In some implementations, the second model 116 may include multiple neural network models, each of which generate corresponding CDF samples for intensity values and distance values, respectively. In some implementations, the model updater 120 can train/update the second model to generate at least two output sets of CDF samples given corresponding input data, which can include a set of CDF samples for a distribution of false-positive point intensity values and a set of CDF samples for a distribution of false-positive point distance values.

The trained/updated second model 116 can be executed by the data processing system 102 to generate one or more output CDF distribution(s) for intensity and/or distance values, which can be used to determine intensity and/or distance values for each additional point 124 indicated to be added in the output data structure generated using the first model 114. To do so, the data processing system 102 can provide the one or more input weather parameters 108 (and in some implementations, the input weather condition 106) as input to the second model 116, as described herein. The data processing system 102 can then execute the second model 116 to produce the output distributions of the CDF functions that model the distance and/or intensity values for false-positive points given the one or more input weather parameters 108.

Once the CDF samples have been generated, the data processing system 102 can generate distance and/or intensity values for each additional point indicated in the output data structure produced by the first model 114. To do so, the data processing system can generate a respective random value (e.g., a uniform random variable between zero and one) for each point indicated in the output data structure of the first model 114. The random value can then be used to perform inverse transform sampling via the samples of the CDF function(s) produced by the second model 116. For example, the data processing system 102 may perform interpolation (e.g., linear interpolation, spline interpolation, etc.) using the set of samples of the CDF to determine a distance value for each additional point 124 indicated in the output data structure. This process can be repeated for corresponding samples of the CDF for intensity values to predict an intensity for each additional point 124 indicated in the output data structure.

Once the distance and intensity values have been predicted for each additional point 124 indicated in the output data structure generated by the first model 114, As described herein, emitters of a sensor (e.g., an emissive sensor) may have a threshold number of points that can be detected for a given scan direction. As such, including additional points 124 (e.g., as false-positives) for a given emitter may cause the threshold number of emitter points for a given scan direction to be exceeded, resulting in inaccurate data. To ensure output accuracy in view of the thresholds, the data processing system 102 can replace at least one point of the attenuated input point cloud 104 with a corresponding additional point 124. For example, if the data processing system 102 determines that the input point cloud 104 includes a threshold number of points for an emitter and scan direction, and that an additional point 124 is to be added for said emitter and scan direction (e.g., as indicated in the output data structure generated by the first model 114), the data processing system can replace one of the points of the input point cloud 104 for that emitter and scan direction with the additional point 124.

In some implementations, the data processing system 102 can replace one or more of the points for that emitter and scan direction upon determining that the intensity of the point is less than the intensity of the additional point 124 (e.g., produced via output of the second model 116). If multiple points correspond to the emitter and scan direction, the data processing system 102 can replace the point having the lowest intensity, if said intensity if less than the intensity of the additional point 124 to be added for that emitter and scan direction. In some implementations, if the predicted intensity of the additional point 124 for a corresponding emitter and scan direction is less than the attenuated intensity of the points included in the point cloud for that emitter and scan direction, the data processing system 102 can discard (e.g., not include) the additional point 124 when the threshold number of points for that emitter and scan direction would otherwise be exceeded.

In some implementations, even if the intensity of the additional point 124 is less than other point(s) in the input point cloud 104 for that emitter and scan direction, the data processing system 102 can add the additional point 124 to the point cloud 104 for the emitter if the threshold number of points for the emitter and scan direction is not exceeded. The data processing system 102 can add each additional point 124 to the attenuated input point cloud 104 by determining a corresponding position in the point cloud and associating each additional point with an indication of its corresponding distance, intensity, emitter, and scan direction, among any other relevant metadata described herein. In some implementations, the data processing system 102 can determine the position (e.g., coordinates, etc.) of each additional point 124 that is to be added to the attenuated input point cloud 104 as a function of the distance and scan direction for the additional point, as well as a frame of reference of the sensor with respect to the input point cloud 104. In some implementations, the data processing system 102 can add each additional point 124 to be included in attenuated input point cloud 104 with a corresponding indication that each additional point 124 is a false-positive point.

Once the additional point(s) 124 are added to the attenuated input point cloud 104, the data processing system 102 can modify a respective distance of one or more points of the attenuated input point cloud 104. To do so, the data processing system 102 can dilate the distance of each point in the attenuated input point cloud 104 that is not indicated as an additional point 124. The dilation process can be a function of the one or more input weather parameter(s) 108 and can correspond specifically to the input weather condition 106. The dilation process can be a function of a location, distance, and/or intensity of said points in the input point cloud 104. The dilation for each point can be calculated via a physical equation that is specific to the input weather condition 106. In some implementations, depending on the input weather condition 106, the data processing system 102 may not necessarily perform distance dilation on the non-false-positive points of the attenuated point cloud 104.

The data processing system 102 can execute a point filtering process 118 to filter at least one point from the input point cloud 104. For example, embodiments that include emissive sensors, each emitter of the sensor used to capture the input point cloud 104 may have a minimum threshold of intensity for creating points in the input point cloud 104. If, following the attenuation process 110 and the distance dilation performed via the data processing system 102, any point has an intensity and/or distance that would otherwise fall outside of ranges that can be detected by the sensor can be filtered from the processed input point cloud 104 to generate the output point cloud 122, which is shown as including the additional points 124 that were included in the input point cloud 104, as described herein. The output point cloud 122, following the various transformations described herein, is a version of the input point cloud 104 in which the input weather condition 106 has been simulated according to the input weather parameters 108. The output point cloud 122 may be provided to an external computing device and/or stored in memory of the data processing system 102. An example output point cloud 122 simulated according to the techniques described herein compared to a point cloud captured under a similar, non-simulated weather condition are described in connection with FIGS. 2C and 3.

Figure 2C:
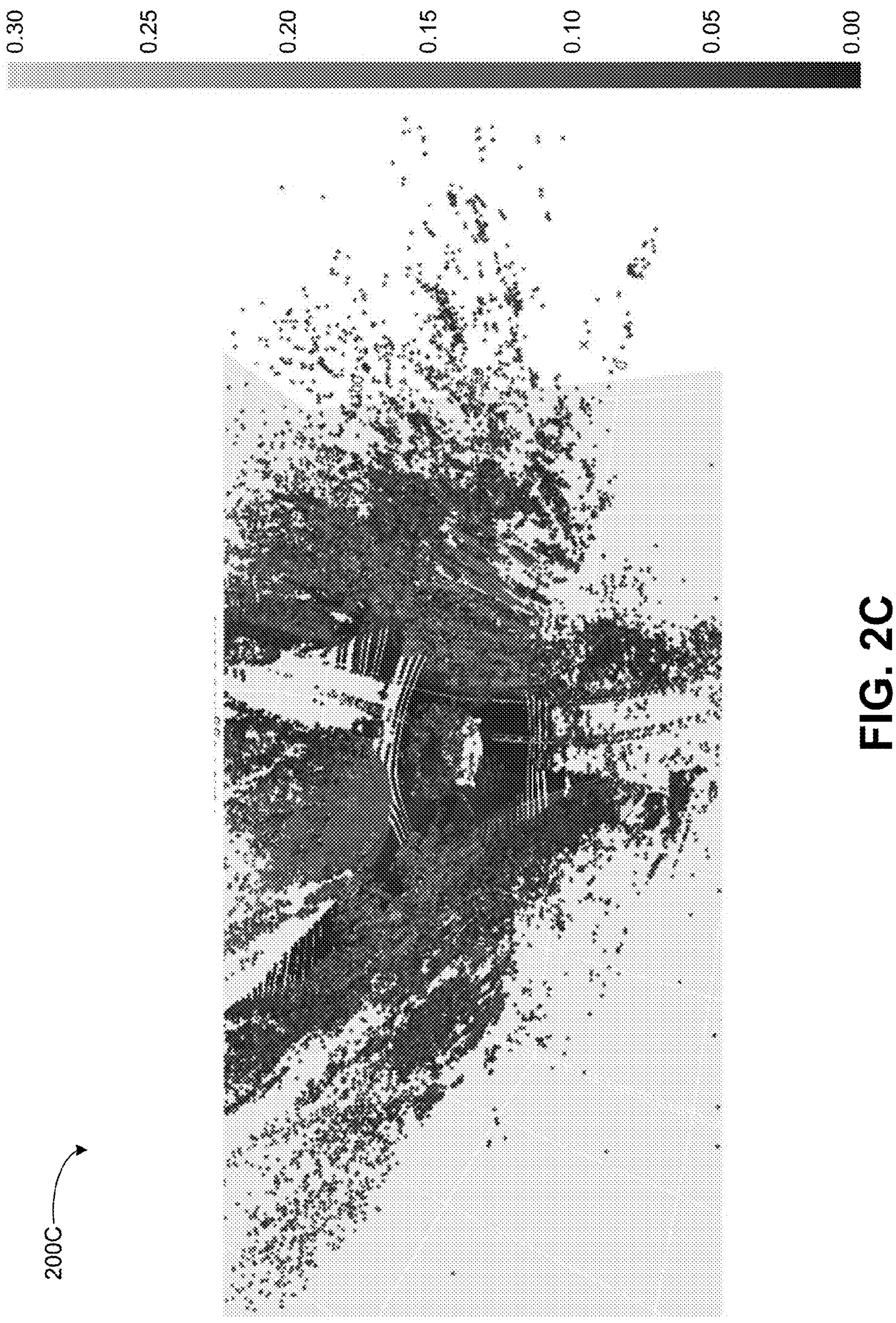
Figure 3:
FIG. 3 illustrates an example plot of a point cloud captured during actual foggy conditions, in accordance with some embodiments of the present disclosure.

Referring to FIGS. 2C and 3, illustrated are example plots 200C and 300 showing respective point clouds captured (e.g., generated, formed, derived) from the same environment. The plot 200C is illustrated as including a point cloud shown in the plot 200A of FIG. 2A, following the processing techniques described herein to attenuate the points (e.g., as shown in the plot 200B of FIG. 2B) to simulate fog, add additional points as they would have appeared under foggy conditions, and dilate and filter various points in the point cloud according to how the points would have been captured under foggy conditions. The plot 300 shows the same scene captured at a different time under actual foggy conditions. The weather parameters (e.g., fog density) used to simulate the foggy weather conditions in the point cloud shown in the plot 200C of FIG. 2C are similar to the weather parameters under which the point cloud shown in the plot 300 was captured.

As shown in the plot 200C, relative to the plot 200B of FIG. 2B, additional false-positive points have been added and distances of certain points have been attenuated. For example, as shown, additional false-positive points have been added near the center of the plot 200C relative to the plot 200B of FIG. 2B. These resemble similar false-positive points captured under real foggy conditions, as shown in the plot 300, which includes a similar ring-like arrangement of false-positive points proximate to the center of the plot 300. Additionally, the distance dilation process that modifies the locations of the non-false-positive points shown in the plot 200C such that they are shown in similar positions to those shown in the plot 300 of FIG. 3.

Figure 4:
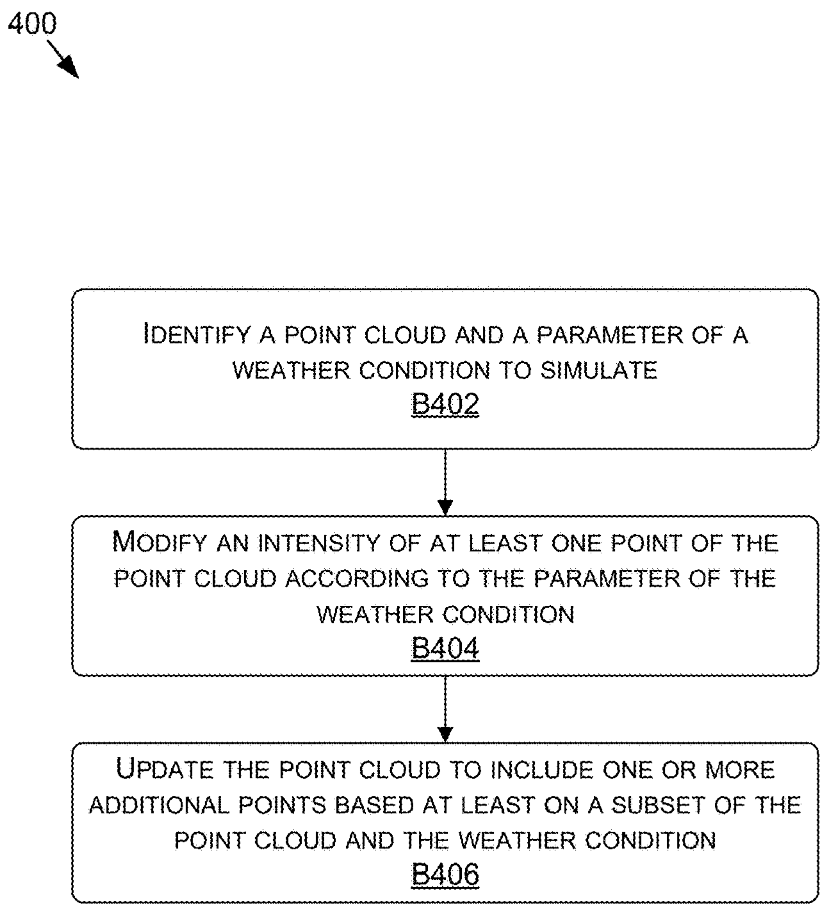
FIG. 4 is a flow diagram of an example of a method for using generative techniques to transform sensor measurements according to configurable atmospheric conditions, in accordance with some embodiments of the present disclosure.

FIG. 4 is a flow diagram showing a method 400 of using generative techniques to transform sensor measurements according to configurable atmospheric conditions, in accordance with some embodiments of the present disclosure. Various operations of the method 400 can be implemented by the same or different devices or entities at various points in time. For example, one or more first devices may implement operations relating to transforming point clouds according to configurable atmospheric conditions and/or training/updating machine-learning models according to the techniques described herein.

The method 400, at block B402, includes identifying a point cloud (e.g., an input point cloud) and a parameter (e.g., one or more input weather parameters 108) of a weather condition (e.g., an input weather condition 106) to simulate. The point cloud can be formed according to data captured from one or more sensors, such as one or more LiDAR sensors or RADAR sensors, among others. The weather condition can include one of snow, rain, or fog, and the parameter of the weather conditions can include one of snow rate, rain rate, or fog intensity, respectively. In some implementations, identifying the point cloud can include receiving a request to simulate the weather condition in the point cloud, where the point cloud is identified or included in the request. In some implementations, identifying the point cloud can include receiving user input that specifies the point cloud and/or the weather condition parameter(s).

The method 400, at block B404, includes modifying an intensity of at least one point of the point cloud according to the parameter of the weather condition. For example, a point cloud attenuation process can be used to attenuate the intensity of one or more points of the point cloud according to the weather parameter and weather condition. In an example where the weather condition is fog, the parameter of the fog can be fog density, and the attenuation process can be a function of the distance of each point relative to a location of the emitter(s) of the (e.g., emissive) sensor that captured the point cloud.

The method 400, at block B406, includes updating the point cloud to include one or more additional points (e.g., the additional points 124) based at least on a subset of the point cloud and the weather condition. To do so, the data processing system can first determine to which emitters and scan directions that additional points are to be added in the point cloud by executing a first machine-learning model (e.g., the first model 114). As described herein, the first model can be trained/updated to predict, for a corresponding emitter of each point of the point cloud, whether a corresponding additional point is to be added. The output of the first machine-learning model can be similar to the output data structure described in connection with Table 1, and can include binary values (or probability values) indicating whether an additional (e.g., false-positive) point is to be added for each combination of emitter and scan direction.

A second machine-learning model (e.g., the second model 116) can be executed to determine a respective predicted intensity and a respective predicted distance for each of the one or more additional points. The second machine-learning model can be trained/updated to produce a set of samples of a CDF for distance and/or intensity values for each additional point generated via the first machine-learning model. The predicted distance and/or intensity values can be determined, for example, by generating a uniform random variable, and interpolating the inverse of the CDF function via the samples generated using the second machine-learning model.

Once the distance and intensity values have been predicted, the additional points can be included in the point cloud. In some implementations, at least one additional point can replace an existing point in the point cloud. For example, if the additional point, when added to the point cloud for a corresponding emitter and scan direction, would cause the number of points for the emitter to exceed a threshold detection limit of the emitter, the additional point can replace one of the points detected for that emitter and scan position. In some implementations, the additional point can replace a point for the emitter and scan position if the intensity of the additional point exceeds that of at least one existing point corresponding to the emitter and scan position in the point cloud.

Any non-false-positive points in the point cloud that have intensity values that fall below a minimum detection threshold of the emitter of the sensor used to generate the point cloud can be filtered from the point cloud. After the filtering process, the distance values of the non-false-positive points in the point cloud can be dilated according to the weather parameter that is to be simulated. The dilation process can be a function of a location, distance, and/or intensity of said points in the point cloud. The dilation for each point can be calculated via a physical equation that is specific to the specified weather condition. The point cloud, following the dilation process, can be provided as output (e.g., the output point cloud 122).

Example Content Streaming System

Figure 5:
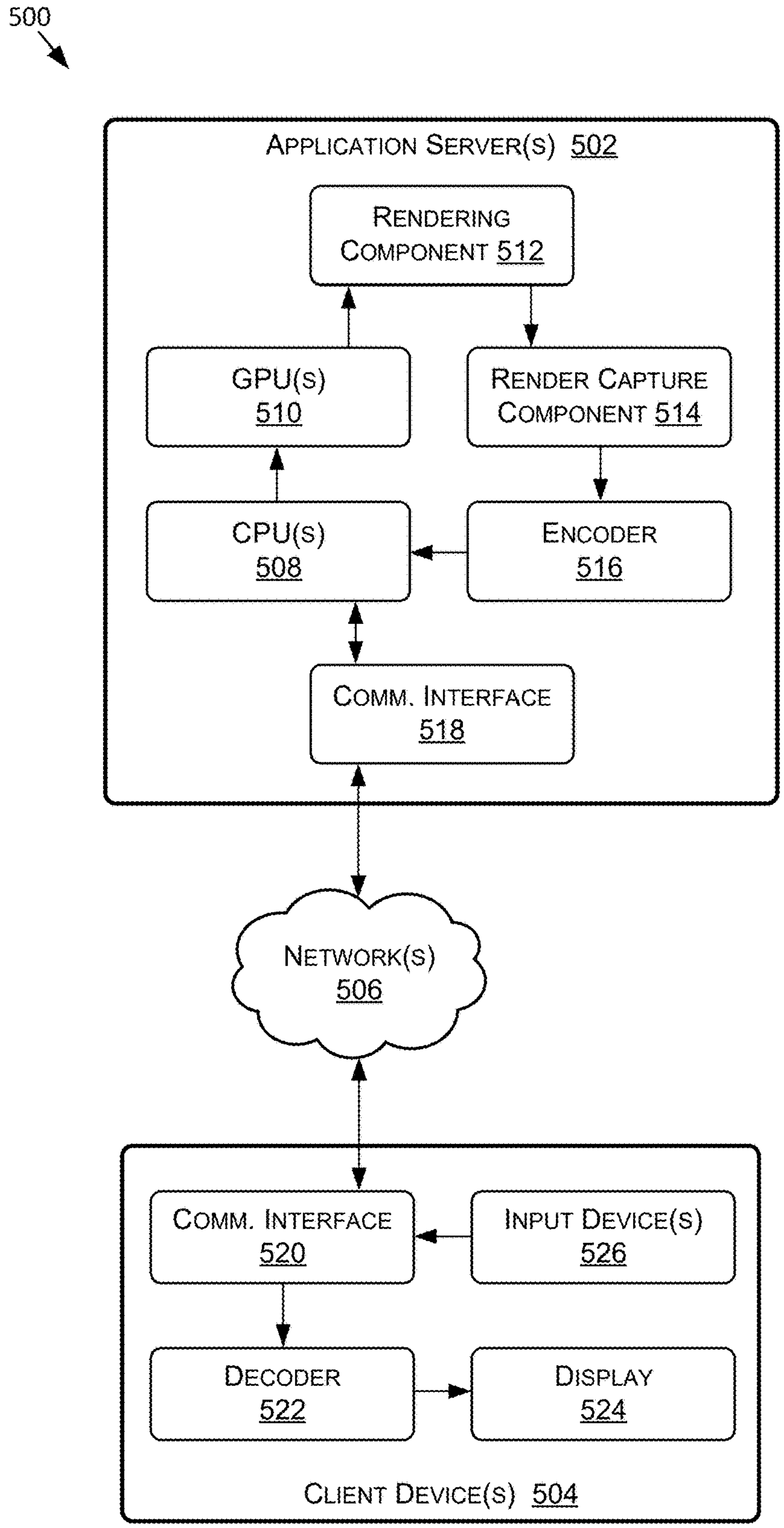
FIG. 5 is a block diagram of an example content streaming system suitable for use in implementing some embodiments of the present disclosure.

Now referring to FIG. 5, is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented to model weather or atmospheric conditions in point clouds, and/or to update/train or execute machine-learning models to simulate the same, as described herein. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 500 can be implemented to receive input indicating one or more features of output to be generated using a neural network model, provide the input to the model to cause the model to generate the output, and use the output for various operations including display or simulation operations.

In the system 500, for an application session, the client device(s) 504 may only receive input data in response to inputs to the input device(s) 526, transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the application server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based at least on receiving the display data from the application server(s) 502. The client device 504 may receive an input to one of the input device(s) 526 and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) 508 may receive the input data, process the input data, and transmit data to the GPU(s) 510 that causes the GPU(s) 510 to generate a rendering of the application session. For example, the input data may be representative of a movement of a character of the user in a game session of a game application, firing a weapon, reloading, passing a ball, turning on a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
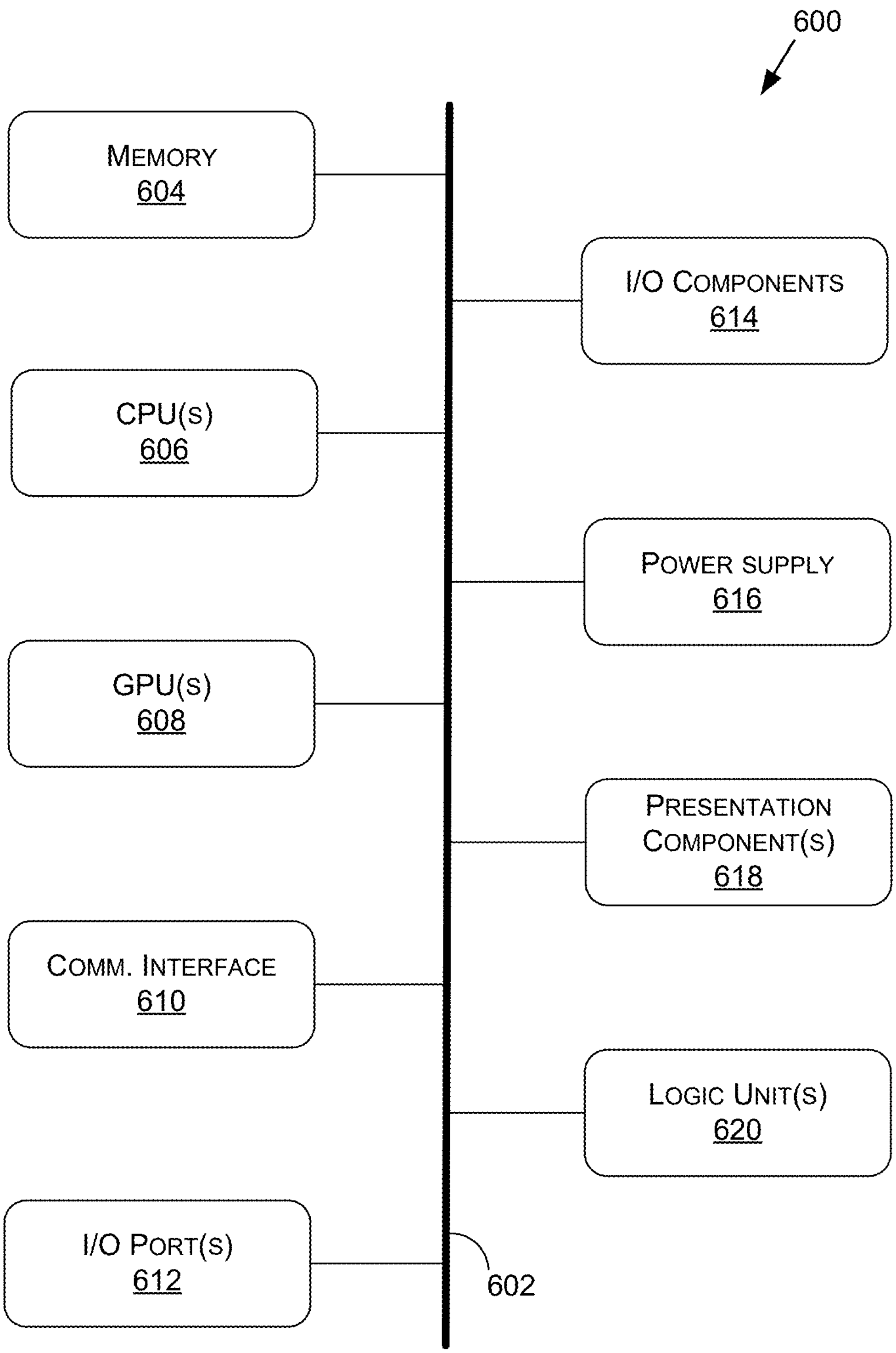
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as “workstation,” “server,” “laptop,” “desktop,” “tablet,” “client device,” “mobile device,” “hand-held device,” “game console,” “electronic control unit (ECU),” “virtual reality system,” and/or other device or system types, as all are contemplated within the scope of the computing device of FIG. 6.

The interconnect system 602 may represent one or more links or busses, such as an address bus, a data bus, a control bus, or a combination thereof. The interconnect system 602 may be arranged in various topologies, including but not limited to bus, star, ring, mesh, tree, or hybrid topologies. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term “modulated data signal” may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU 608 may include its own memory or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that allow the computing device 600 to communicate with other computing devices via an electronic communication network, including wired and/or wireless communications. The communication interface 610 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608. In some embodiments, a plurality of computing devices 600 or components thereof, which may be similar or different to one another in various respects, can be communicatively coupled to transmit and receive data for performing various operations described herein, such as to facilitate latency reduction.

The I/O ports 612 may allow the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that allow detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to allow the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
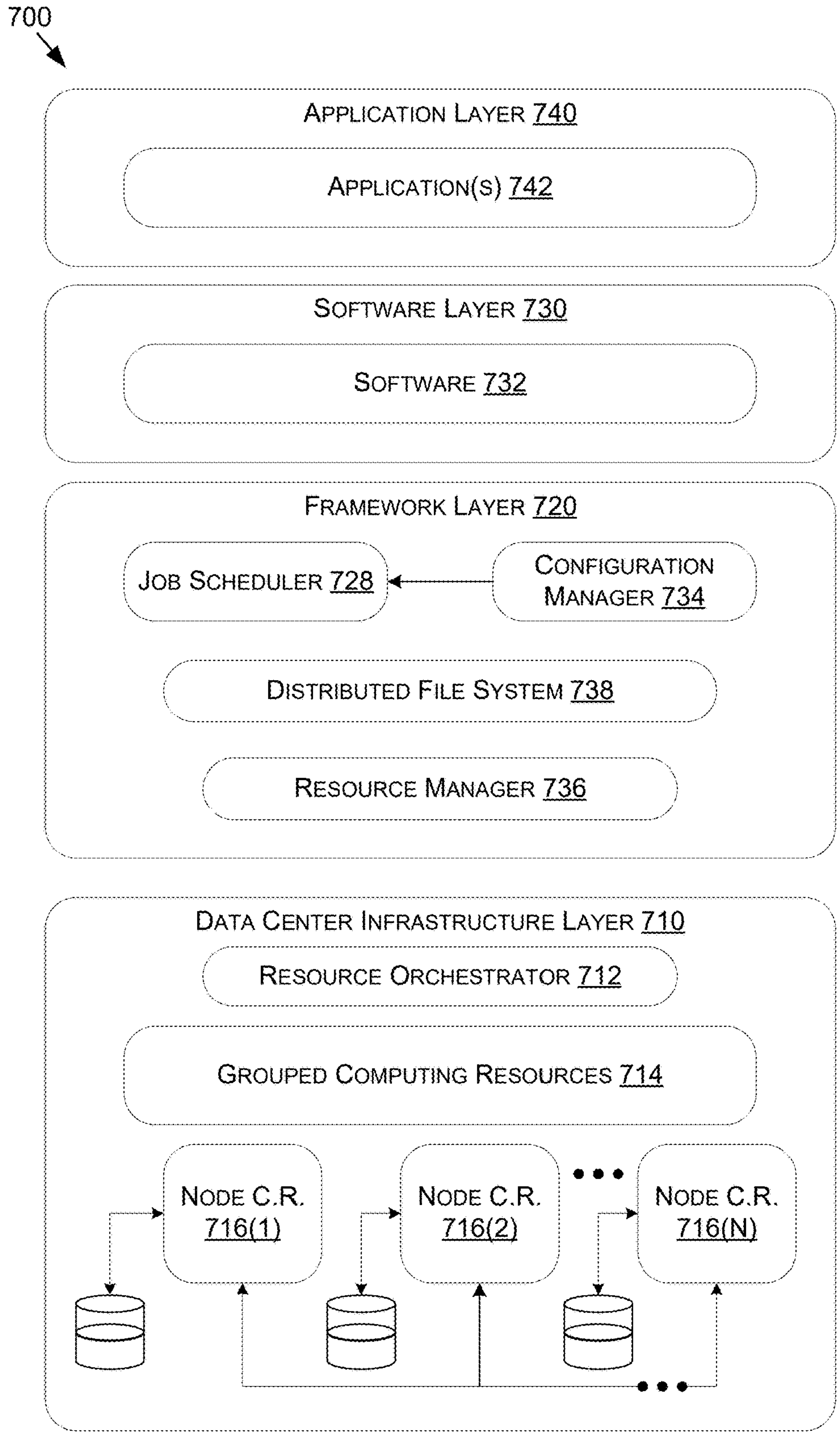
FIG. 7 is a block diagram of an example data center suitable for use in implementing some embodiments of the present disclosure.

FIG. 7 illustrates an example data center 700 that may be used in at least one embodiments of the present disclosure, such as to implement the systems 100, 200, or in one or more examples of the data center 700. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine-learning application, including training or inferencing software, machine-learning framework software (e.g., PyTorch, TensorFlow, Caffe, etc.), and/or other machine-learning applications used in conjunction with one or more embodiments, such as to update/train machine-learning models (e.g., the first model 114, the second model 116, etc.) to simulate weather conditions in point clouds.

In at least one embodiment, any of configuration manager 734, resource manager 736, and resource orchestrator 712 may implement any number and type of self-modifying actions based at least on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to update/train one or more machine-learning models (e.g., the first model 114, the second model 116, etc.) or predict or infer information using one or more machine-learning models according to one or more embodiments described herein. For example, a machine-learning model(s) may be updated/trained by calculating weight parameters according to a neural network architecture using software and/or computing resources described above with respect to the data center 700. In at least one embodiment, trained or deployed machine-learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to update/train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

one or more circuits to:

identify a point cloud comprising a plurality of points and at least one parameter of a weather condition to simulate;

modify an intensity of at least one of the plurality of points according to the at least one parameter of the weather condition;

update, based at least on a subset of the plurality of points and the at least one parameter of the weather condition, a number of points comprised in the point cloud;

determine at least one point of the plurality of points that satisfies an emitter threshold; and replace the at least one point of the plurality of points with at least one additional point having a higher intensity than the at least one point.

2. The processor of claim 1, wherein the point cloud is formed according to data captured from at least one of: one or more light detection and ranging (LiDAR) sensors or one or more radio detection and ranging (RADAR) sensors.

3. The processor of claim 1, wherein the number of points comprised in the point cloud is updated to include one or more additional points, and the one or more circuits are to determine that each of the one or more additional points are to be included in the point cloud using a first machine learning model updated to predict, for a corresponding emitter of each point of the point cloud, whether a corresponding additional point is to be added.

4. The processor of claim 1, wherein the number of points comprised in the point cloud is updated to include one or more additional points, and the one or more circuits are to determine, using a second machine-learning model, a respective predicted intensity and a respective predicted distance for each of the one or more additional points.

5. The processor of claim 1, wherein the weather condition comprises at least one of: snow, rain, or fog, and the at least one parameter includes at least one of: snow rate, rain rate, or fog intensity, respectively.

6. The processor of claim 1, wherein the one or more circuits are to:

filter at least one point from the point cloud.

7. The processor of claim 1, wherein the one or more circuits are to modify a respective distance of a subset of the plurality of points of the point cloud.

8. The processor of claim 1, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for performing generative AI operations;

a system implemented using one or more large language models (LLMs);

a system implemented using one or more vision language models (VLMs);

a system for generating synthetic data;

a system incorporating one or more virtual machines (VMs);

a system implemented at least partially in a data center; or a system implemented at least partially using cloud computing resources.

9. A processor comprising:

one or more circuits to:

identify a training dataset comprising a plurality of points, each of the plurality of points associated with a corresponding label identifying a prediction for an additional point and at least one corresponding weather condition parameter; and provide the training dataset to update a neural network, the neural network to generate predictions of whether additional points are to be added for corresponding emitters of input point clouds.

10. The processor of claim 9, wherein the one or more circuits are to update a second neural network to generate predicted intensities for the additional points.

11. The processor of claim 10, wherein the one or more circuits are to update the second neural network to generate predicted distances for the additional points.

12. The processor of claim 9, wherein the training dataset comprises a plurality of point clouds, at least one point cloud of the training dataset being associated with at least one respective weather condition parameter and at least one respective set of labels.

13. The processor of claim 12, wherein the at least one respective weather condition parameter includes at least one of: snow rate, rain rate, or fog intensity, respectively.

14. The processor of claim 9, wherein the neural network comprises a convolutional neural network.

15. A method, comprising:

identifying, using one or more processors, a point cloud comprising a plurality of points and at least one parameter of an atmospheric condition to simulate;

modifying, using the one or more processors, an intensity of at least one of the plurality of points according to the at least one parameter of the atmospheric condition;

updating, using the one or more processors and based at least on a subset of the plurality of points and the at least one parameter of the atmospheric condition, a number of points comprised in the point cloud;

determining, using the one or more processors, at least one point of the plurality of points that satisfies an emitter threshold; and replacing, using the one or more processors, the at least one point of the plurality of points with at least one additional point having a higher intensity than the at least one point.

16. The method of claim 15, wherein the updating the number of points comprises including one or more additional points, the method further comprising determining, using the one or more processors, that at least one of the one or more additional points are to be included in the point cloud using a first machine learning model that predicts, for a corresponding emitter of the at least one point of the point cloud, whether a corresponding additional point is to be added.

17. The method of claim 15, wherein the updating the number of points comprises including one or more additional points, the method further comprising determining, using the one or more processors and a second machine-learning model, a respective predicted intensity and a respective predicted distance for each of the one or more additional points.

18. The method of claim 15, further comprising filtering, using the one or more processors, at least one point from the point cloud.

* * * * *